(12) United States Patent
Imanishi

(10) Patent No.: US 8,520,788 B2
(45) Date of Patent: Aug. 27, 2013

(54) RECEIVING DEVICE, RECEIVING METHOD AND PROGRAM

(75) Inventor: Masayuki Imanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 13/313,255

(22) Filed: Dec. 7, 2011

(65) Prior Publication Data

US 2012/0147999 A1    Jun. 14, 2012

(30) Foreign Application Priority Data

Dec. 14, 2010    (JP) ................................ P2010-277714

(51) Int. Cl.
*H04L 7/00*    (2006.01)
(52) U.S. Cl.
USPC ........... 375/354; 375/372; 375/376; 711/154; 711/156
(58) Field of Classification Search
USPC ......... 375/354, 369, 372, 376; 711/154–156; 327/141, 155, 156, 159, 160
See application file for complete search history.

(56) References Cited

U.S. PATENT DOCUMENTS

| 6,198,689 B1 * | 3/2001 | Yamazaki et al. | 365/233.1 |
| 6,687,255 B1 * | 2/2004 | Holm et al. | 370/412 |
| 7,571,338 B2 * | 8/2009 | Osterling et al. | 713/500 |

\* cited by examiner

*Primary Examiner* — Dac Ha
(74) *Attorney, Agent, or Firm* — Frommer Lawrence & Haug LLP; William S. Frommer

(57) ABSTRACT

A receiving device includes: a buffer temporarily accumulating receive data received through a network; a data processing means for processing the receive data; a short-time variation value acquisition means for acquiring a short-time variation value indicating variation of accumulated quantity of the receive data sequentially accumulated in the buffer in a first unit time; a long-time variation value acquisition means for acquiring a long-time variation value indicating variation of accumulated quantity in a second unit time; and a clock control means for controlling a clock frequency for performing processing of the receive data by the data processing means in accordance with evaluation results of the acquired long-time variation value. The clock control means stops adjustment of the clock frequency when an error of the network or the receive data is detected, and starts the adjustment again after a given adjustment stop time passes from the detection of the error.

9 Claims, 10 Drawing Sheets

RECEIVING DEVICE, RECEIVING METHOD AND PROGRAM

FIELD

The present disclosure relates to a receiving device, a receiving method and a program, and particularly relates to a receiving device, a receiving method and a program capable of reliably synchronizing clocks.

BACKGROUND

Recently, services of transmitting and providing data of moving pictures or audio through networks are becoming popular due to development of information communication means represented by Internet. As a data transmission system used in this kind of services, a so-called streaming transmission system is widely used.

FIG. 1 is a block diagram showing a configuration of a moving-picture delivery system performing moving-picture delivery using a network.

In the moving-picture delivery system, moving pictures imaged by a camera 11 are transmitted to a receiving device 14 through a network 13 by a transmission device 12 and displayed on a display 15. Specifically, data of imaged moving pictures is encoded by an encoder 21 and further packetized into RTP (Real time Transport Protocol) packets and the like in the transmission device 12, and then, data is transmitted through the network 13. In the receiving device 14, the RTP packets are received through the network 13, and the data stored in the RTP packets is decoded by a decoder 34 to be displayed on the display 15.

In the transmission device 12, the encoder 21 encodes data by operating based on a frequency of a clock A inputted with the data of moving pictures imaged by the camera 11. On the other hand, in the receiving device 14, the decoder 34 decodes the data received through the network 13 by operating based on a frequency of a clock B generated by a CPU 31 to a VCXO 33. The receiving device 14 is provided with a buffer (not shown) for temporarily accumulating received data. When moving picture delivery is performed for long hours, the buffer overflows in the case where the clock A on the transmission side is faster than the clock B on the receiving side. In contrast to this, when the clock A on the transmission side is slower than the clock B on the receiving side, the buffer will underflow.

As described above, it is necessary that the clock A on the transmission side is synchronized with the clock B on the receiving side in order to perform moving picture delivery using the network in a stable condition.

In the case where moving-picture delivery is performed by using broadcasting waves, clocks are synchronized by comparing a difference value of a PCR (Program Clock Reference) stored in a TS packet (Transport Stream Packet) with a difference value of a STC (System Time Clock) by appropriate operation of a subtractor 61 to a STC counter 66 in a receiving device 51 as shown in FIG. 2. When the system is applied to the moving-picture delivery using the network, it is difficult to completely synchronize clocks on the transmission side and the receiving side because jitter of the TS packet is higher in the network as compared with broadcasting waves.

A commonly-owned invention (for example, Japanese Patent No. 4438878 (Patent Document 1)) proposes a system intended to deliver moving-picture using the network, in which a time stamp of a received TTS packet (Time stamped Transport Stream Packet) is compared with the STC of a receiving device to thereby perform synchronization processing.

As effects of jitter in the network is considered in the above proposal, clocks can be synchronized even in an environment with jitter, however, if information of the STC and the like is not acquired for some reason, it may be difficult to synchronize clocks because the time stamp of the TTS packet is compared with the STC.

Additionally, as a method of synchronizing clocks not using information of the time stamp of the TTS packet, the STC and the like, a method of monitoring accumulated quantity of a buffer which temporarily accumulates receive data to perform clock control in accordance with monitoring results is proposed (for example, refer to JP-A-2003-304224 (Patent Document 2).

SUMMARY

In moving-picture delivery using networks, errors sometimes occur such that packet loss occurs when a sufficient communication band is not obtained or that communication paths are broken due to network disturbance.

In the technique disclosed in the Patent Document 2, the clock frequency is merely controlled in accordance with the accumulated quantity of the buffer, therefore, it is difficult to control clocks when an error such as packet loss occurs and the accumulated quantity of the buffer largely varies. As a result, clocks are not synchronized well.

In view of the above, it is desirable to synchronize clocks reliably even when errors such as packet loss occur.

An embodiment of the present disclosure is directed to a receiving device including a buffer temporarily accumulating receive data received through a network, a data processing means for processing the receive data accumulated in the buffer, a short-time variation value acquisition means for acquiring a short-time variation value indicating variation of accumulated quantity of the receive data sequentially accumulated in the buffer in a first unit time, a long-time variation value acquisition means for acquiring a long-time variation value indicating variation of accumulated quantity in a second unit time longer than the first unit time and a clock control means for controlling a clock frequency for performing processing of the receive data by the data processing means in accordance with evaluation results of the acquired long-time variation value, in which the clock control means stops adjustment of the clock frequency when an error of the network or the receive data is detected based on the acquired short-time variation value, and starts adjustment of the clock frequency again after a given adjustment stop time passes from the detection of the error.

The clock control means may detect the error and stop adjustment of the clock frequency in accordance with evaluation results of the long-time variation value when temporal variation of the short-time variation value exceeds a predetermined first threshold.

The clock control means may adjust the clock frequency in accordance with evaluation results of the long-time variation value when temporal variation of the short-time variation value is equal to or lower than the first threshold.

The clock control means may perform evaluation so that the clock frequency is set to a first frequency which is higher than a present frequency when temporal variation of the long-time variation value exceeds a range determined by a predetermined second threshold, the clock frequency is set to a second frequency which is lower than the present frequency when temporal variation of the long-time variation value is lower than the range determined by the second threshold, and the clock frequency is maintained at the present frequency when temporal variation of the long-time variation value is within the range determined by the second threshold.

The receiving device may further include an accumulated quantity acquisition means for acquiring present accumulated quantity of the receive data sequentially accumulated in the buffer, and the clock control means, when adjustment of the clock frequency in accordance with evaluation results of the long-time variation value is stopped, may make an adjustment so that the clock frequency is set to a first frequency which is higher than a present frequency when the acquired accumulated quantity exceeds a predetermined upper limit value of the accumulated quantity of the buffer, the clock frequency is set to a second frequency which is lower than the present frequency when the acquired accumulated quantity is lower than a predetermined lower limit value of the accumulated quantity of the buffer, and the clock frequency is maintained at the present frequency when the acquired accumulated quantity is equal to or lower than the upper limit value as well as equal to or higher than the lower limit value.

The short-time variation value may be an average value of accumulated quantity of the receive data sequentially accumulated in the buffer, which is obtained in the second time scale as the first unit time, and the long-time variation value may be an average value of accumulated quantity of the receive data sequentially accumulated in the buffer, which is obtained in the minute time scale as the second unit time.

The error may be network disturbance or change of a network path as the error of the network, or packet loss as the error of the receive data.

Another embodiment of the present disclosure is directed to a receiving method by a receiving device having a buffer temporarily accumulating receive data received through a network and a data processing means for processing the receive data accumulated in the buffer, which includes acquiring a short-time variation value indicating variation of accumulated quantity of the receive data sequentially accumulated in the buffer in a first unit time, acquiring a long-time variation value indicating variation of accumulated quantity in a second unit time longer than the first unit time, controlling a clock frequency for performing processing of the receive data by the data processing means in accordance with evaluation results of the acquired long-time variation value, stopping adjustment of the clock frequency when an error of the network or the receive data is detected based on the acquired short-time variation value and starting adjustment of the clock frequency again after a given adjustment stop time passes from the detection of the error.

Still another embodiment of the present disclosure is directed to a program allowing a computer controlling a device having a buffer temporarily accumulating receive data received through a network and a data processing means for processing the receive data accumulated in the buffer to execute processing including acquiring a short-time variation value indicating variation of accumulated quantity of the receive data sequentially accumulated in the buffer in a first unit time, acquiring a long-time variation value indicating variation of accumulated quantity in a second unit time longer than the first unit time, controlling a clock frequency for performing processing of the receive data by the data processing means in accordance with evaluation results of the acquired long-time variation value, stopping adjustment of the clock frequency when an error of the network or the receive data is detected based on the acquired short-time variation value and starting adjustment of the clock frequency again after a given adjustment stop time passes from the detection of the error.

The network means a structure in which at least two devices are connected and information can be transmitted from a given device to other devices. The devices performing communication through the network can be independent devices as well as internal blocks included in one device.

In the receiving device, the receiving method and the program according to the embodiments of the present disclosure, the short-time variation value indicating variation of accumulated quantity of the receive data sequentially accumulated in the buffer in a first unit time is acquired, the long-time variation value indicating variation of accumulated quantity in the second unit time longer than the first unit time is acquired and the clock frequency for performing processing the receive data by the data processing means is controlled in accordance with evaluation results of the acquired long-time variation value. The adjustment of the clock frequency is stopped when the error of the network or the receive data is detected based on the acquired short-time variation value, and adjustment of the clock frequency is started again after the given adjustment stop time passes from the detection of the error.

According to the embodiments of the present disclosure, clocks can be reliably synchronized.

DETAILED DESCRIPTION

Figure 1:
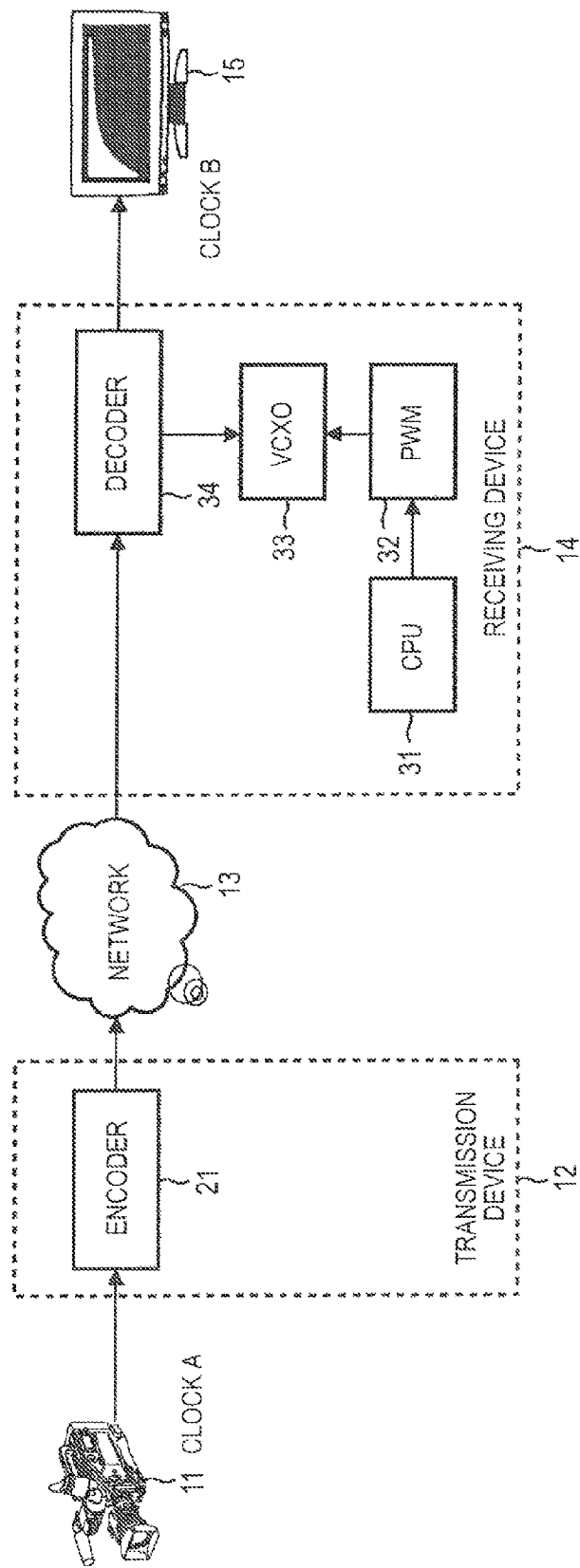
FIG. 1 is a block diagram showing a configuration of a moving-picture delivery system performing moving-picture delivery using a network.
Figure 2:
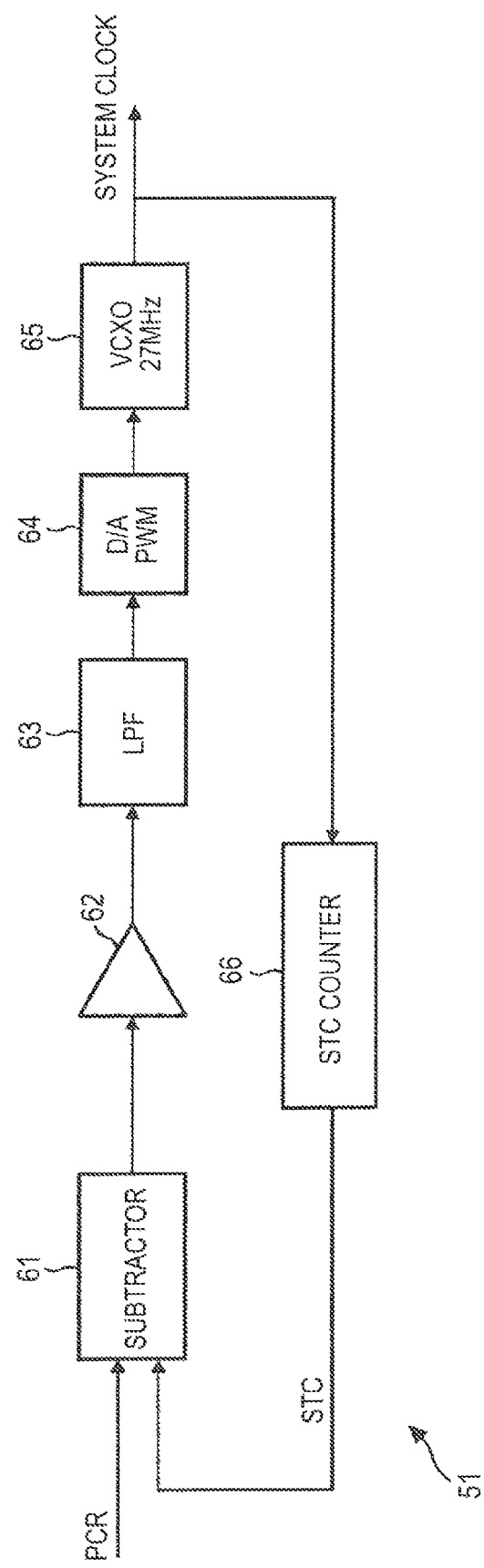
FIG. 2 is a block diagram showing a configuration of a receiving device in moving-picture delivery using broadcasting waves.
Figure 3:
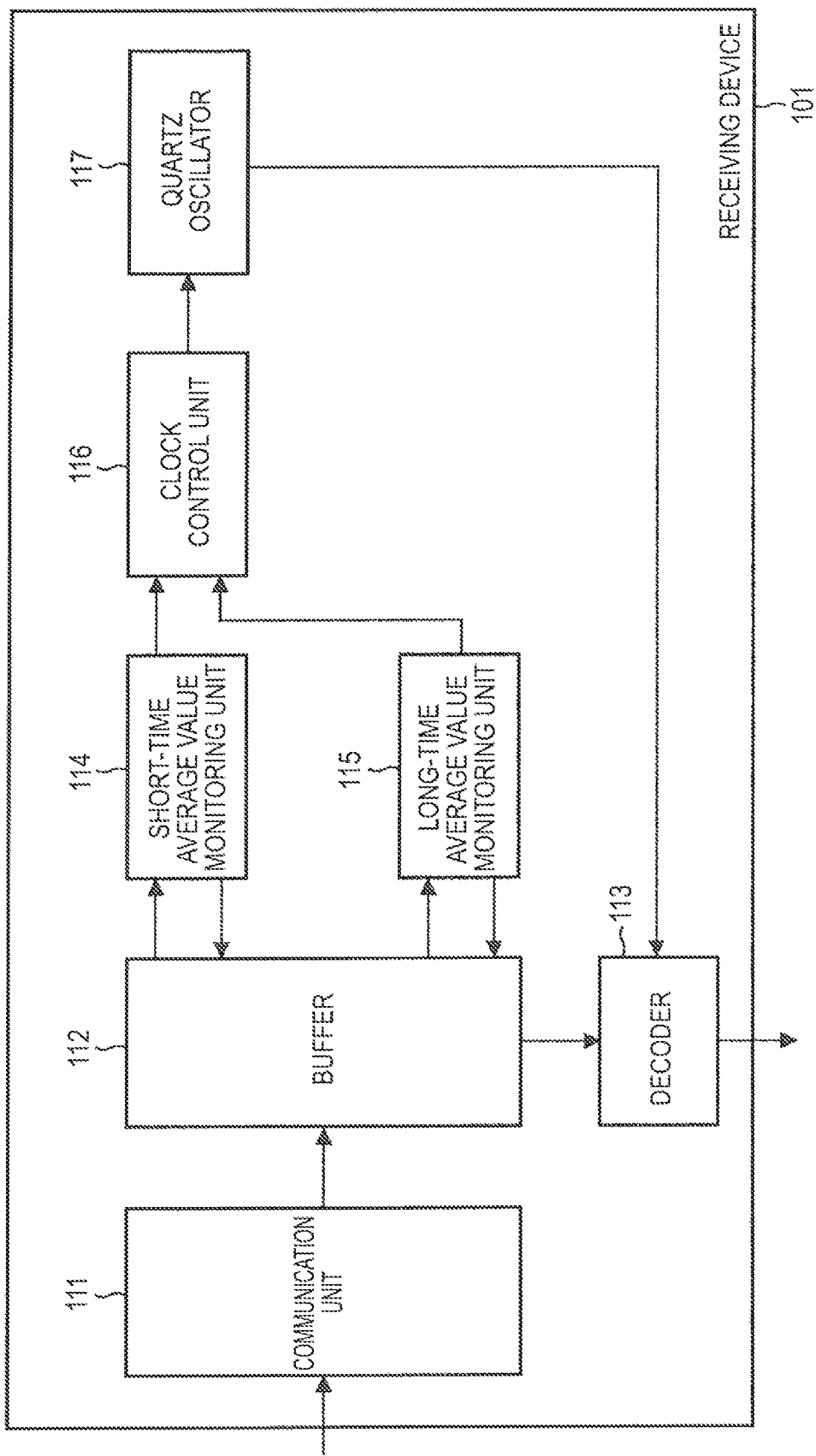
FIG. 3 is a block diagram showing a configuration of a receiving device to which an embodiment of the present disclosure is applied.

Hereinafter, modes for carrying out the present disclosure (hereinafter referred to as embodiments) will be explained. The explanation will be made in the following order.
1. First Embodiment
2. Second Embodiment 1. First Embodiment FIG. 3 is a block diagram showing a configuration of a receiving device to which an embodiment of the present disclosure is applied.

A receiving device 101 includes a communication unit 111, a buffer 112, a decoder 113, a short-time average value monitoring unit 114, a long-time average value monitoring unit 115, a clock control unit 116 and a quartz oscillator 117.

The communication unit 111 receives receive data such as moving pictures transmitted from a transmission device through a network and supplies the data to the buffer 112.

The buffer 112 temporarily accumulates the receive data supplied from the communication unit 111 and sequentially supplies the accumulated receive data to the decoder 113.

The short-time average value monitoring unit 114 acquires an average value of the accumulated quantity of receive data accumulated in the buffer 112 obtained per a short unit time such as in the second time scale (hereinafter, referred to as a short-time average value E) by monitoring the accumulated quantity of receive data accumulated in the buffer 112, and supplies the value to the clock control unit 116.

The long-time average value monitoring unit 115 acquires an average value of the accumulated quantity of receive data accumulated in the buffer 112 obtained per a long unit time such as in the minute time scale (hereinafter, referred to as a long-time average value F) by monitoring the accumulated quantity of receive data accumulated in the buffer 112, and supplies the value to the clock control unit 116.

The short-time average value E from the short-time average value monitoring unit 114 and the long-time average value F from the long-time average value monitoring unit 115 are supplied to the clock control unit 116. The clock control unit 116 controls the quartz oscillator 117 based on the short-time average value E and the long-time average value F supplied from respective monitoring units to control the clock frequency supplied from the quartz oscillator 117 to the decoder 113.

The decoder 113 decodes the receive data accumulated in the buffer 112 in accordance with the clock frequency supplied from the quartz oscillator 117 and supplies the data to a display (not shown) and so on in a subsequent stage.

The receiving device 101 of FIG. 3 is configured as described above.

[Clock Control using the Accumulated Quantity of the Buffer]

Next, the concept of clock control using the accumulated quantity of receive data accumulated in the buffer 112 will be explained with reference to FIG. 4 and FIG. 5.

Figure 4:
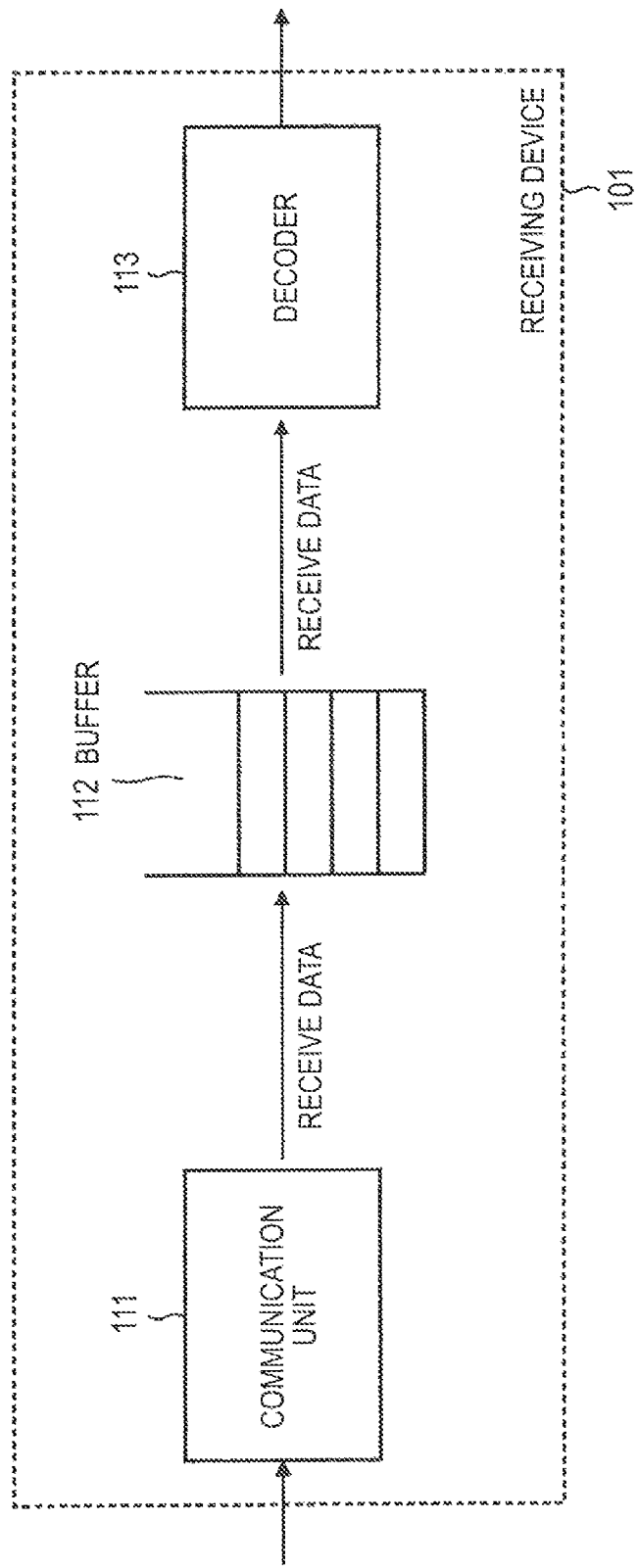
FIG. 4 is a block diagram showing concept of clock control using accumulated quantity of a buffer.

In FIG. 4, the communication unit 111, the buffer 112 and the decoder 113 in blocks included in the receiving device 101 of FIG. 3 are selectively shown for simplifying the explanation.

As shown in FIG. 4, receive data received by the communication unit 111 is accumulated in the buffer 112 once. Then, the receive data accumulated in the buffer 112 is taken out from the buffer 112 and transferred to the decoder 113 at the highest speed processable by the decoder 113.

Here, when a clock A used for encoding receive data on the transmission side is faster than a clock B used for decoding receive data on the receiving side, the accumulated quantity of receive data in the buffer 112 is increased as the speed of the clock A on the transmission side is higher. On the other hand, when the clock A on the transmission side is slower than the clock B on the receiving side, the accumulated quantity of receive data in the buffer 112 is reduced as the speed of the clock A on the transmission side is lower. That is, synchronization of clocks can be realized by adjusting the clock B used in the decoder 113 on the receiving side so that the data size of receive data in the buffer 112 is fixed.

Figure 5:
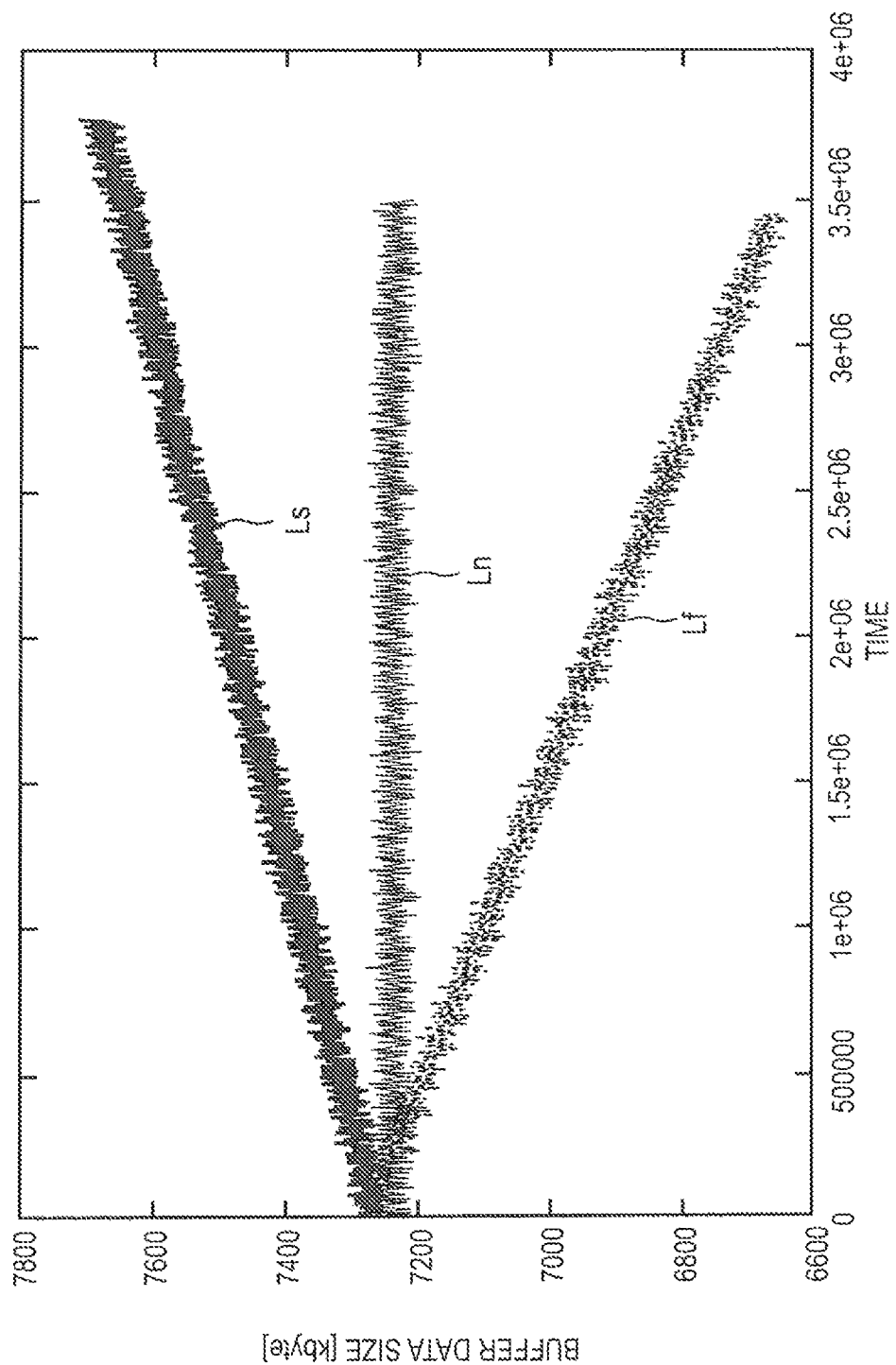
FIG. 5 is a graph showing transition of accumulated quantity of the buffer.

FIG. 5 shows a graph showing transition of accumulated quantity of receive data accumulated in the buffer 112. In FIG. 5, the horizontal axis represents a time axis, and the direction of time is from the left side to the right side. The vertical axis represents the time average value obtained from actual measured values of the accumulated quantity of the buffer 112, which means that the value increases toward the upper side of the graph.

In three lines shown in FIG. 5, a line $L_s$ in which the value increases with a time lapse indicates transition obtained when the clock B is slower than the clock A. A line $L_n$, in which values are almost fixed indicates transition obtained when the clock B is almost the same as the clock A, and a line $L_f$ in which the value decreases with a time lapse indicates transition obtained when the clock B is faster than the clock A.

That is, the transition indicated by the line $L_n$ obtained when the clock B is almost the same as the clock A is ideal in the clock control, therefore, in the cases of transition indicated by the line $L_s$ and the line $L_f$, the frequency of the clock B is adjusted so that the transition of these lines comes close to the transition of the line $L_n$.

As described above, in order to synchronize the clock of the decoder 113 on the receiving side with the clock of the encoder on the transmission side, it is preferable that the accumulated quantity of receive data accumulated in the buffer 112 is monitored and the control of adjusting the clock frequency is performed in accordance with the monitoring results.

[Clock Control Processing]

Next, clock control processing executed by the clock control unit 116 of FIG. 3 will be explained with reference to a flowchart of FIG. 6.

The clock control unit 116 acquires the short-time average value E obtained by monitoring by the short-time average value monitoring unit 114 (Step S11) and determines whether an absolute value of variation of the acquired short-time average value E ($|E\_t-E\_(t-1)|$) exceeds a change allowable threshold G or not (Step S12). In "E_t-E_(t-1)", a time instant "t" and a time instant "t-1" stand for intervals of monitoring by the short-time average value monitoring unit 114, and intervals of these time instants will be short time scales such as several seconds as described above.

The change allowable threshold G is a reference value for detecting errors such as packet loss, network disturbance or change of a network path based on the short-time average value E. As the change allowable threshold G is set to be lower, errors such as packet loss can be sensitively detected. As the change allowable threshold G, for example, a value corresponding to network environment is set in advance.

When it is determined that the absolute value of variation of the acquired short-time average value E is equal to or lower than the change allowable threshold G in Step S12, processing proceeds to Step S13. In Step S13, the clock control unit 116 acquires the long-time average value F obtained by monitoring by the long-time average value monitoring unit 115 and determines whether the variation of the acquired long-time average value F (F_u-F_(u-1)) exceeds a positive change allowable threshold H or not (Step S14). In "F_u-F_(u-1)", a time instant "u" and a time instant "u-1" stand for intervals of monitoring by the long-time average value monitoring unit 115, and intervals of these time instants will be long time scales such as several minutes as described above.

The change allowable threshold H is a reference value for evaluating the long-time average value F and determining the clock frequency used for decoding processing of the decoder 113. As the change allowable threshold H, for example, a value corresponding to performance of the quartz oscillator 117 is set in advance.

When it is determined that the variation of the long-time average value F exceeds the positive change allowable threshold H in Step S14, the processing proceeds to Step S15. In Step S15, the clock control unit 116 makes an adjustment so that the clock frequency used for decoding processing of the decoder 113 is increased to thereby speed up the clock.

On the other hand, when it is determined that the variation of the long-time average value F is equal to or lower than the positive change allowable threshold H in Step S14, the process proceeds to Step S16. In Step S16, the clock control unit 116 determines whether the variation of the long-time average value F is lower than a negative change allowable threshold H or not.

When it is determined that the variation of the long-time average value F is lower than the negative change allowable threshold H in Step S16, the process proceeds to Step S17. In Step S17, the clock control unit 116 makes an adjustment so that the clock frequency used for decoding processing of the decoder 113 is reduced to thereby slow down the clock.

On the other hand, it is determined that the variation of the long-time average value F is equal to or higher than the negative change allowable threshold H in Step S16, the process proceeds to Step S18. In Step S18, the clock control unit 116 maintains the present speed without adjusting the clock frequency used for decoding processing of the decoder 113.

As described above, the clock control unit 116 evaluates the long-time average value F by comparing the variation of the long-time average value F (F_u−F_(u−1)) with H, −H. Then, the clock control unit 116 controls the clock frequency in accordance with the evaluation results.

That is, in the receiving device 101, the clock frequency is increased and decoding processing using the higher speed clock is executed when F_u−F_(u−1) exceeds H. When F_u−F_(u−1) is lower than −H, the clock frequency is reduced and decoding processing using lower speed clock is executed. When F_u−F_(u−1) is equal to or higher than −H as well as equal to or lower than H, the clock frequency is not adjusted and decoding processing is executed at the present clock frequency. The adjustment range of high and low in the clock frequency can be appropriately adjusted in accordance with the accumulated quantity of the buffer 112 or performance of the quartz oscillator 117.

When the processing of Step S17 or Step S18 is completed, the process returns to Step S11 and the determination processing of Step S12 is executed again. When it is determined that the absolute value of variation of the acquired short-time average value E is equal to or lower than the change allowable threshold G, the above-described processing from Step S13 to Step S18 is repeated. Accordingly, the receive data accumulated in the buffer 112 is maintained to the appropriate accumulated quantity and the clock of the decoder 113 approximately corresponds to the clock of the encoder on the transmission side.

On the other hand, when an error such as packet loss occurs and it is determined that the absolute value of variation of the acquired short-time average value E exceeds the change allowable threshold G in Step S12, the process proceeds to Step S19. Then, the clock control unit 116 starts clocking of time during which adjustment of the clock frequency is stopped (Step S19), and the processing of Step S19 to Step S20 is repeated until the clocking reaches the end of an adjustment stop time a ("Yes" in Step S20).

That is, during a period from clocking the time during which adjustment of the clock frequency is stopped due to occurrence of the error such as packet loss until reaching the adjustment stop time α, adjustment of the clock frequency in accordance with evaluation results of the long-time average value F (Step S13 to Step S18) is stopped. Then, after the adjustment stop time cc passes and effects due to the reduction of receiving data accumulated in the buffer 112 by the occurrence of the error such as packet loss disappear, the adjustment of the clock frequency is started again. As the adjustment stop time α, for example, a period of time such as for several minutes which corresponds to the monitoring interval by the long-time average value monitoring unit 115 is set in advance.

When the processing of Step S20 is completed, the processing returns to Step S11 and the determination processing of Step S12 is executed again. When it is determined that the absolute value of variation of the short-time average value E is equal to or lower than the change allowable threshold G ("No" in Step S12), adjustment of the clock frequency in accordance with evaluation results of the long-time average value F. On the other hand, when it is determined that the absolute value of variation of the short-time average value E exceeds the change allowable threshold G ("Yes" in Step S12) due to occurrence of the error such as packet loss, adjustment of the clock frequency in accordance with evaluation results of the long-time average value F during the given adjustment stop time α. The above clock control processing is performed by the clock control unit 116 during decoding processing by the decoder 113.

Figure 7:
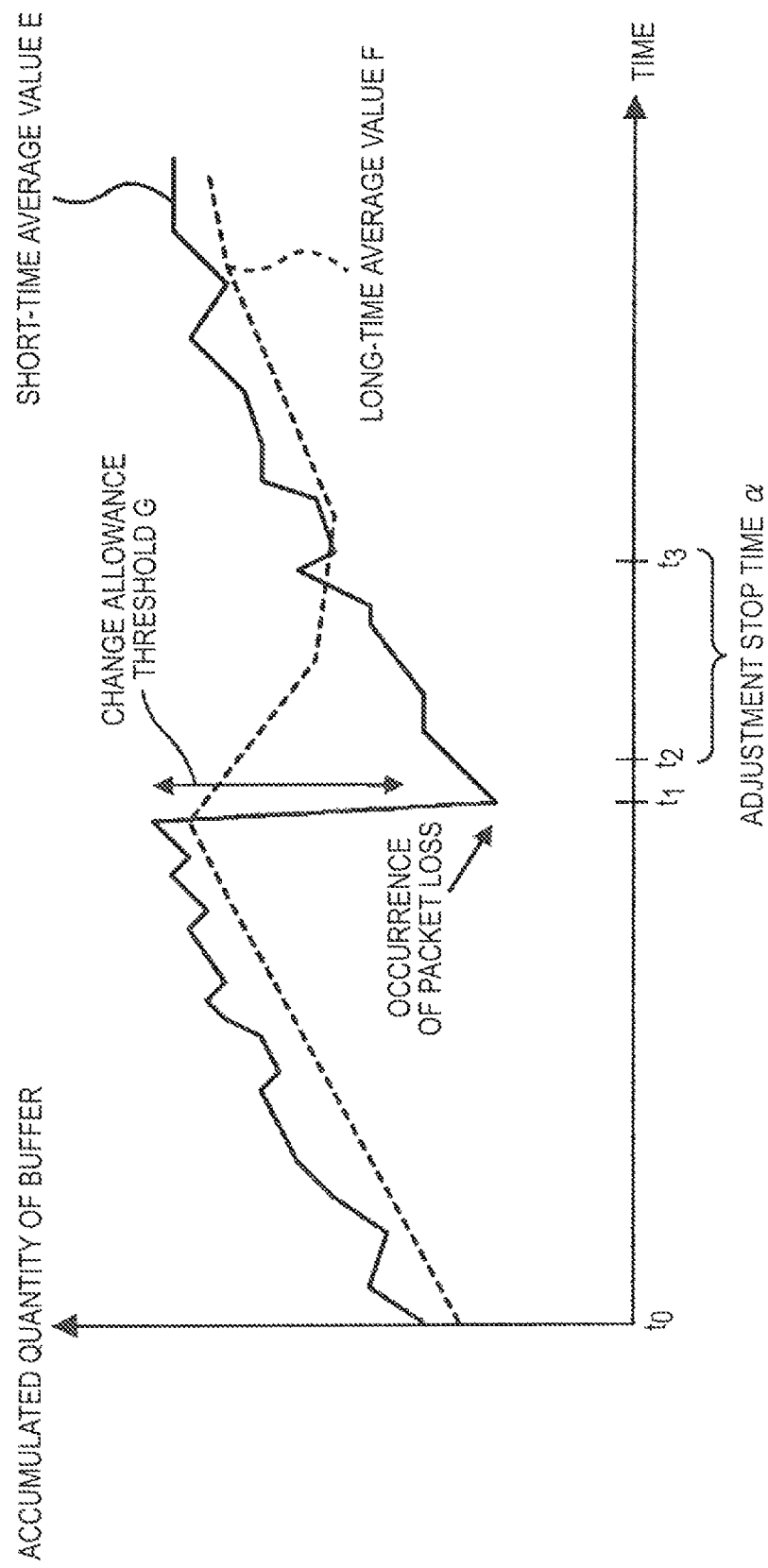
FIG. 7 is a graph showing temporal transition of a short-time average value and a long-time average value.

FIG. 7 shows the accumulated quantity of receive data accumulated in the buffer 112 in time series. In FIG. 7, the horizontal axis represents the time axis, and the direction of time is from the left side to the right side. The vertical axis represents the accumulated quantity of the buffer 112, which means that the accumulated quantity increases toward the upper side of the graph.

In FIG. 7, a solid line indicates variation of the short-time average value E and a broken line indicates variation of the long-time average value F.

That is, both the short-time average value E and the long-time average value F increase in accordance with the accumulated value of data to be accumulated in the buffer 112 during a period from a time instant "t0" to a time instant "t1". Concerning the short-time average value E, the variation range is more delicate as well as more accurate accumulated quantity is shown as monitoring intervals are shorter than the long-time average value F. In the period from the time instant "t0" to the time instant "t1", an error such as packet loss does not occur, therefore, adjustment of clock frequency in accordance with evaluation results of the long-time average value F is made.

After that, at the time instant "t1", the accumulated quantity of the buffer 112 is reduced because the packet loss occurs. At this time, the accumulated quantity is gradually reduced in the long-time average value F as the monitoring intervals are long, whereas, the accumulated quantity is steeply reduced in the short-time average value E as the monitoring intervals are short. In the clock control processing of FIG. 6 described above, whether the packet loss occurs or not is determined by determining whether the absolute value of variation of the short-time average value E exceeds the change allowable threshold G or not (Step S12 of FIG. 6), therefore, even when the accumulated quantity is steeply reduced due to the packet loss, the change can be promptly detected.

When the accumulated quantity is steeply reduced by the packet loss at the time instant "t1", the adjustment of the clock frequency in accordance with evaluation results of the long-time average value F is stopped until the adjustment stop time a passes (a period from a time instant "t2" to a time instant "t3" of FIG. 7). After that, when the adjustment stop time a passes at the time instant "t3", the adjustment of the clock frequency in accordance with evaluation results of the long-time average value F is started again.

As described above, jitter is high in moving-picture delivery using networks, therefore, it is ideal that the clock frequency used by the decoder 113 is adjusted based on the long-time average value F with reduced effects of jitter. However, in the case where the clock frequency is adjusted when the long-time average value F is largely reduced due to occurrence of the error such as packet loss, the frequency is not properly adjusted, which causes large slowdown of the clock as shown in FIG. 7. Accordingly, the clock control unit 116 of FIG. 3 monitors the long-time average value F as well as the short-time average value E. When the absolute value of variation of the short-time average value E exceeds the change allowable threshold G, the clock control unit 116 assumes that occurrence of the error in the network or in receive data, such as packet loss, network disturbance, change of the network path or the like has been detected. Then, the adjustment of the clock frequency in accordance with evaluation results of the long-time average value F is not performed until the given adjustment stop time α passes after the error is detected.

Accordingly, the clock of the decoder 113 on the receiving side is synchronized with the clock of the encoder on the transmission side even when an error such as packet loss occurs, therefore, long moving-pictures can be delivered stably without breaking up the video.

In the receiving device 101 of FIG. 3, the short-time average value E and the long-time average value F obtained from the accumulated quantity of the buffer 112 are used for clock synchronization, not using information of the time stamp of the TTS packet, the STC and the like, therefore, clocks can be synchronized only by the processing completed in the receiving device 101. As a result, clocks can be synchronized only by the change on the side of the receiving device 101, not depending on the transmission device on the side of delivering moving pictures when synchronizing clocks.

Moreover, as the receiving device 101 of FIG. 3 does not depend on a network format at the time of transmission, the receiving device 101 can comply with various transmission systems such as TTS/RTP, MP4/HTTP, as well as various transmission systems to be used anew in future. As the receiving device 101 does not depend on information of the time stamp of the TTS packet, the STC and the like, information acquired from a codec is not necessary, therefore, the device can be applied to all codecs.

2. Second Embodiment

[Configuration of a Receiving Device]

Figure 8:
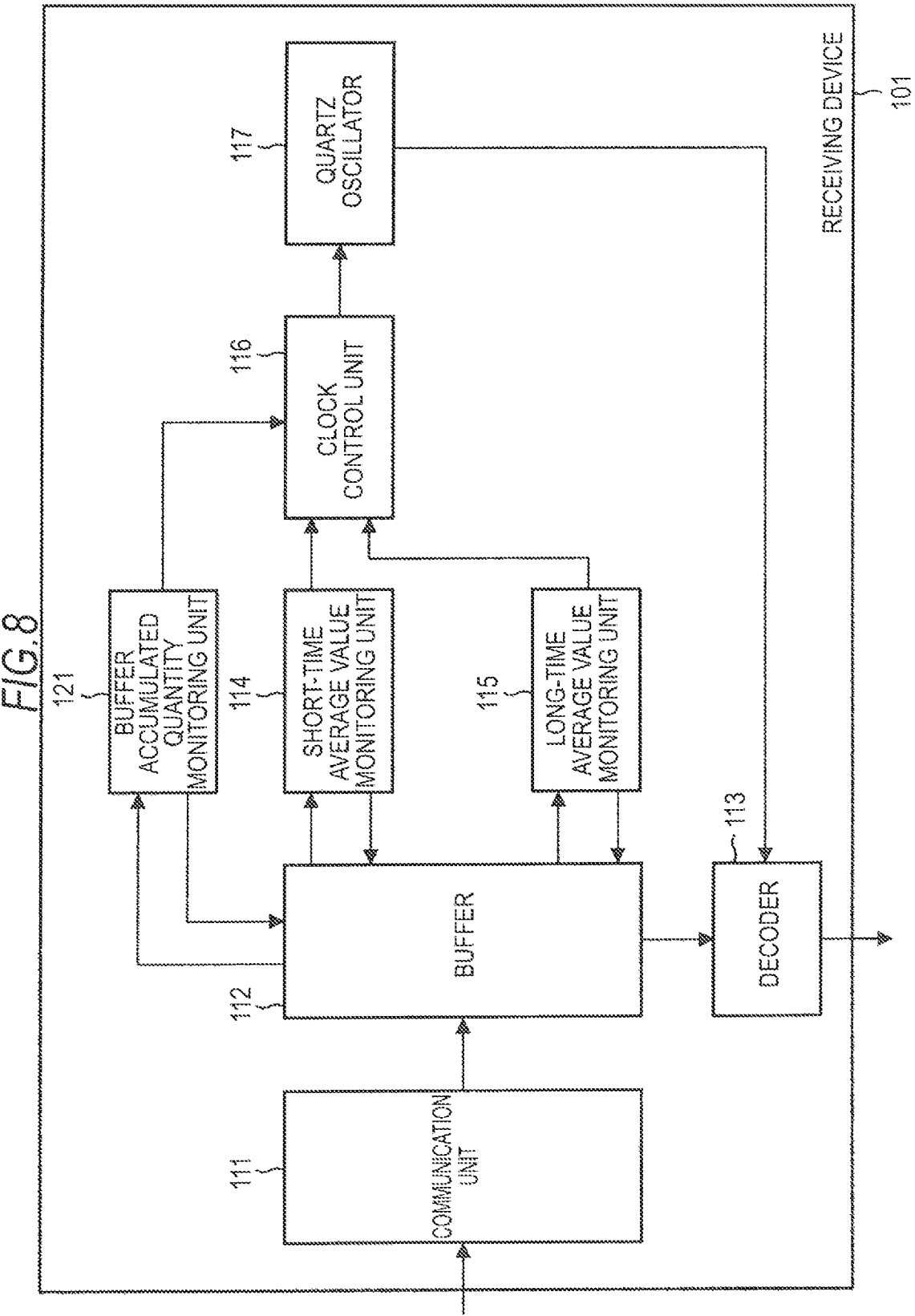
FIG. 8 is a block diagram showing a configuration of a receiving device to which another embodiment of the present disclosure is applied.

FIG. 8 is a block diagram showing a configuration of a receiving device to which another embodiment of the present disclosure is applied.

The receiving device 101 of FIG. 8 is different from the receiving device 101 of FIG. 3 in a point of that a buffer accumulated quantity monitoring unit 121 is provided as a block for monitoring the buffer 112, in addition to the short-time average value monitoring unit 114 and the long-time average value monitoring unit 115. As other components are the same as the receiving device 101 of FIG. 3, the explanation is appropriately omitted.

The buffer accumulated quantity monitoring unit 121 acquires present accumulated quantity of the buffer 112 (hereinafter, referred to as a buffer accumulated quantity B_v) by monitoring accumulated quantity of receive data accumulated in the buffer 112, supplying the quantity to the clock control unit 116.

The buffer accumulated quantity B_v is supplied from the buffer accumulated quantity monitoring unit 121 to the clock control unit 116, in addition to the short-time average value E and the long-time average value F. The clock control unit 116 controls the quartz oscillator 117 based on the short-time average value E, the long-time average value F and the buffer accumulated quantity B_v supplied from respective monitoring units to thereby control the clock frequency supplied from the quartz oscillator 117 to the decoder 113.

The receiving unit 101 of FIG. 8 is configured as described above.

[Clock Control Processing]

Figure 9:
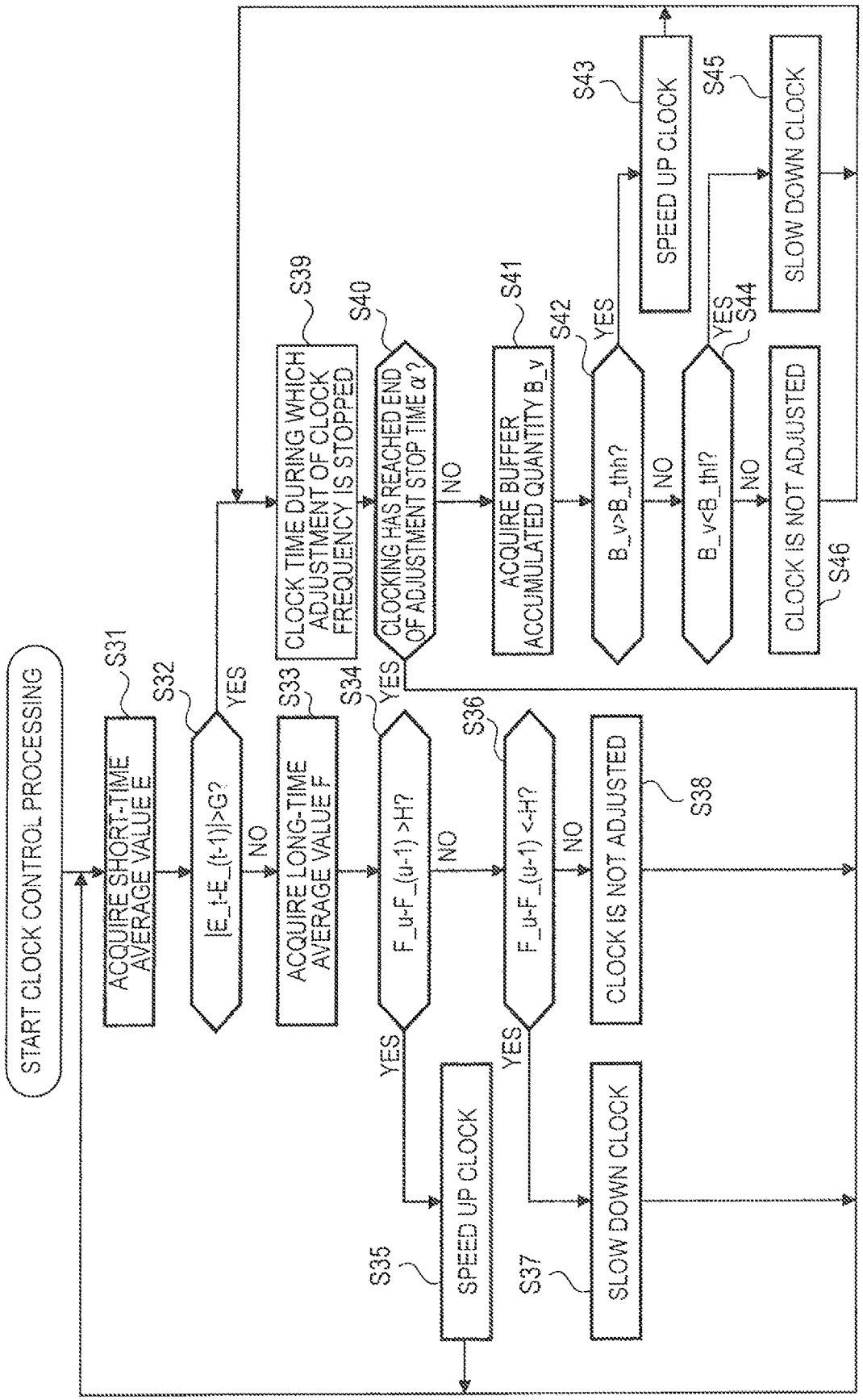
FIG. 9 is a flowchart for explaining clock control processing by a clock control unit of FIG. 8.

Next, clock control processing executed by the clock control unit 116 of FIG. 8 will be explained with reference to a flowchart of FIG. 9.

Figure 6:
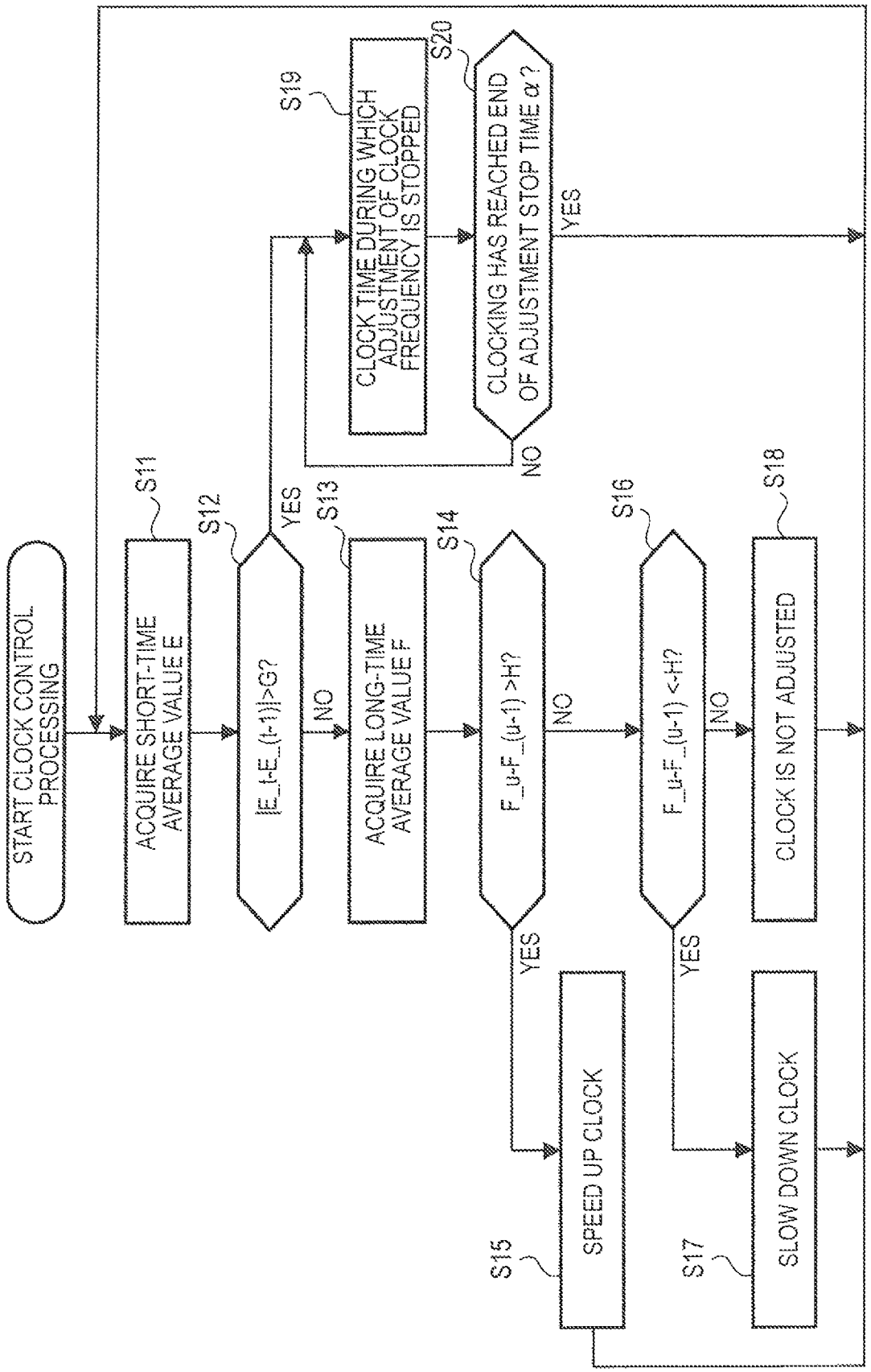
FIG. 6 is a flowchart for explaining clock control processing by a clock control unit of FIG. 3.

In Step S31 to Step S38, when it is determined that the absolute value of variation of the short-time average value E is equal to or lower than the change allowable threshold G ("No" in Step S32), processing of Step S31 to Step S38 is executed and the adjustment of the clock frequency in accordance with evaluation results of the long-time average value F is performed in the same manner as Step S11 to Step S18 of FIG. 6.

On the other hand, when it is determined that the absolute value of variation of the short-time average value E exceeds the change allowable threshold G in Step S32, the determination means that an error such as packet loss has occurred, therefore, the process proceeds to Step S39. Then, the clock control unit 116 starts clocking of time during which adjustment of the clock frequency is stopped (Step S39), and the processing of Step S41 to Step S46 is repeated until the clocking reaches the end of the adjustment stop time α ("Yes" in Step S40).

That is, the clock control unit 116 acquires the buffer accumulated quantity B_v obtained by monitoring by the buffer accumulated quantity monitoring unit 121 and determines whether the acquired buffer accumulated quantity B_v exceeds an upper limit value B_thh of the accumulated quantity of the buffer 112 or not (Step S42).

When it is determined that the buffer accumulated quantity B_v exceeds an upper limit value B_thh in Step S42, the processing proceeds to Step S43. The clock control unit 116 makes an adjustment so that the clock frequency used for decoding processing of the decoder 113 is increased to thereby speed up the clock in Step S43.

On the other hand, when the buffer accumulated quantity B_v is equal to or lower than the upper limit value B_thh in Step S42, the process proceeds to Step S44. The clock control unit 116 determines whether the buffer accumulated quantity B_v is lower than a lower limit value B_thl of the accumulated quantity of the buffer 112 or not in Step S44.

When it is determined that the buffer accumulated quantity B_v is lower than the lower limit value B_thl in Step S44, the process proceeds to Step S45. The clock control unit 116 makes an adjustment so that the clock frequency used for decoding processing of the decoder 113 is reduced to thereby slow down the clock in Step S45.

On the other hand, when it is determined that the buffer accumulated quantity B_v is equal to or higher than the lower limit value B_thl in Step S44, the process proceeds to Step S46. The clock control unit 116 maintains the present speed without adjusting the clock frequency used for decoding processing of the decoder 113 in Step S46.

As described above, the clock control unit 116 compares the buffer accumulated quantity B_v with the upper limit value B_thh as well as the lower limit value B_thl to thereby continue monitoring the buffer accumulated quantity B_v.

Then, the clock control unit 116 adjusts the clock frequency in accordance with monitoring results.

That is, when the buffer accumulated quantity B_v exceeds the upper limit value B_thh, the clock frequency is increased and decoding processing using the higher speed clock is executed in the receiving device 101. When the buffer accumulated quantity B_v is lower than the lower limit value B_thl, the clock frequency is reduced and decoding processing using the lower speed clock is executed. When the buffer accumulated quantity B_v is equal to or lower than the upper limit value B_thh as well as equal to or higher than the lower limit value B_thl, decoding processing is executed at the present clock frequency without adjusting the clock frequency.

When the processing in Step S43, step S45 or Step S46 is completed, the processing returns to Step S39, where the processing from Step S39 to Step S40 is executed again and the processing from Step S41 to Step S46 is repeated until the clocking reaches the end of the adjustment stop time α ("Yes" in Step S40).

As described above, in the clock control unit 116 of FIG. 8, the buffer accumulated quantity B_v is monitored while the adjustment of the clock frequency in accordance with evaluation results of the long-time average value F is stopped, and when the buffer accumulated quantity B_v is not within the range between the upper limit value B_thh and the lower limit value B_thl, the adjustment of the clock frequency is made in accordance with monitored results.

According to the above configuration, it is possible to prevent overflow or underflow which may occur in the buffer 112 in advance while the adjustment of the clock frequency in accordance with evaluation results of the long-time average value F is stopped. That is, the clock of the decoder 113 on the receiving side is gradually synchronized with the clock of the encoder on the transmission side, occurrence of overflow or underflow in the buffer 112 on the receiving side is suppressed and the moving-picture delivery using networks can be performed stably for long hours.

[Explanation of a Computer to which the Embodiments of the Present Disclosure is Applied]

Next, the above series of processing can be performed by hardware as well as software. When the series of processing is performed by software, a program forming the software is installed to a general-purpose computer or the like.

Figure 10:
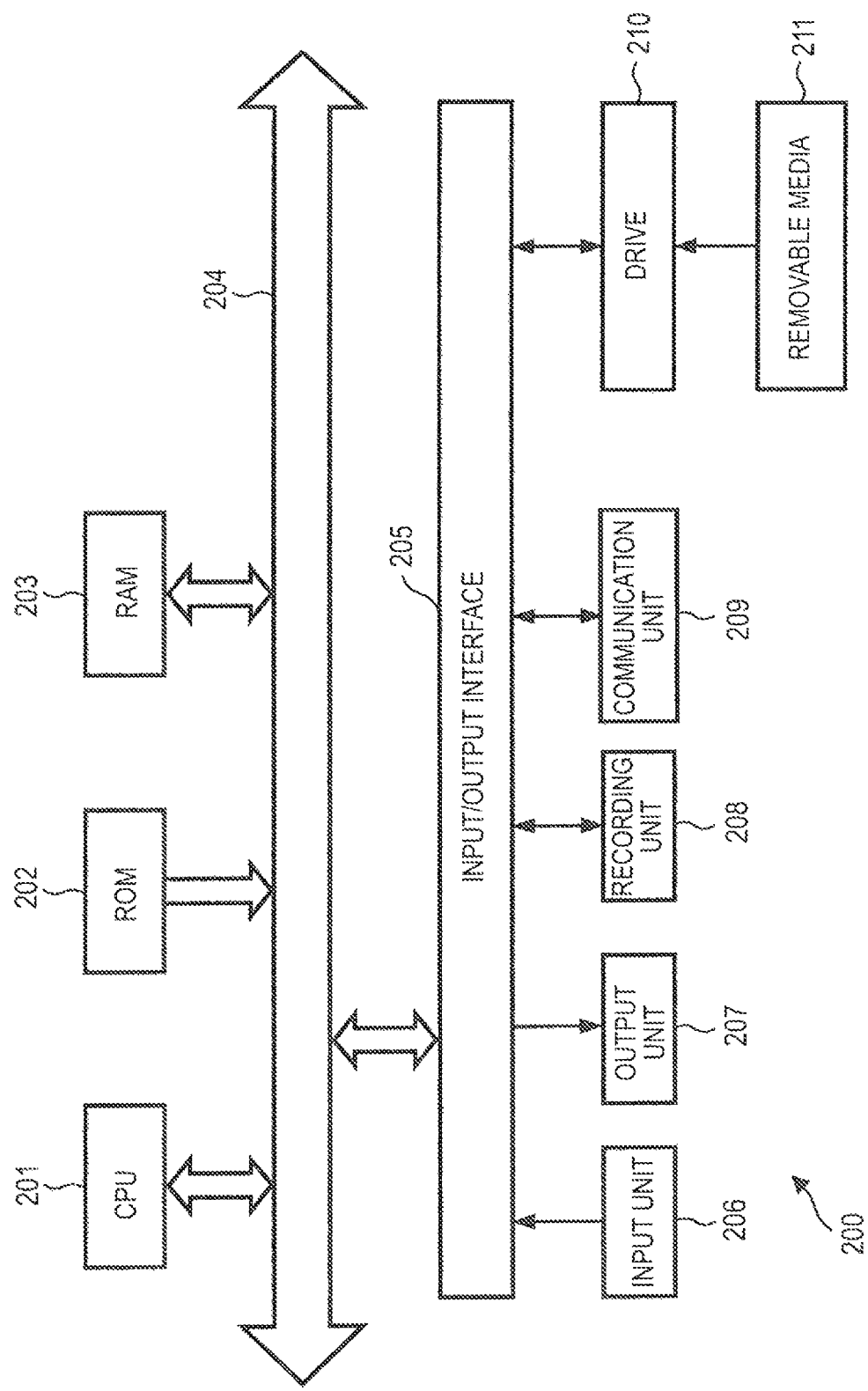
FIG. 10 is a block diagram showing a configuration example of hardware of a computer.

Accordingly, FIG. 10 shows a configuration example of a computer according to the embodiment, to which the program executing the above series of processing is installed.

The program can be previously recorded in a recording unit 208 such as a hard disc or a ROM (Read Only Memory) 202 included in the computer 200.

The program can be also stored (recorded) temporarily or permanently in removal media 211 such as a flexible disc, a CD-ROM (Compact Disc Read Only Memory), a MO (Magneto Optical) disc, a DVD (Digital Versatile Disc), a magnetic disc and a semiconductor memory. Such removable media 211 can be provided as so-called packaged software.

The program can be installed in the computer 200 not only from the above removable media 211 but also installed in the recording unit 208 by receiving programs by a communication unit 209, which is transferred to the computer 200 from a download site through a satellite for digital satellite broadcasting or transferred to the computer 200 through networks such as a LAN (Local Area Network) and Internet.

The computer 200 includes a CPU (Central Processing Unit) 201. An input/output interface 205 is connected to the CPU 201 through a bus 204. When instructions are inputted by a user, for example, operating an input unit 206 including a keyboard, a mouse, a microphone and the like through the input/output interface 205, the CPU 201 executes the program stored in the ROM 202. The CPU 201 also loads the program to a RAM (Random Access Memory) 203 and executes the program, which is the program stored in the recording unit 208, the program transferred from the satellite or the network, received by the communication unit 209 and installed in the recording unit 208, or the program reading from the removable media 211 mounted on a drive 210 and installed in the recording unit 208. Accordingly, the CPU 201 performs processing in accordance with the above flowcharts or processing executed by the configurations of the above block diagrams. Then, the CPU 201 outputs the processing results from an output unit 207 including a LCD (Liquid Crystal Display), a speaker and so on, transmits the results from the communication unit 209 or records the results in the recording unit 208 through, for example, the input/output interface 205 according to need.

Here, in the present specification, it is not always necessary that processing steps describing the program for allowing the computer to execute various processing are processed in time series along the order described as the flowchart and the steps include processing executed in parallel or individually (for example, parallel processing or processing by objects).

The program can be processed one computer as well as can be processed by plural computers in a distributed manner. The program can be transferred to a remote computer and executed there.

In the present specification, the system indicates the whole device including plural devices.

The embodiment of the present disclosure is not limited to the above described embodiments and various modifications may occur within a scope not departing from the gist of the present disclosure.

The present disclosure contains subject matter related to that disclosed in Japanese Priority Patent Application JP 2010-277714 filed in the Japan Patent Office on Dec. 14, 2010, the entire content of which is hereby incorporated by reference.

What is claimed is:

1. A receiving device comprising:
    a buffer temporarily accumulating receive data received through a network;
    a data processing means for processing the receive data accumulated in the buffer;
    a short-time variation value acquisition means for acquiring a short-time variation value indicating variation of accumulated quantity of the receive data sequentially accumulated in the buffer in a first unit time;
    a long-time variation value acquisition means for acquiring a long-time variation value indicating variation of accumulated quantity in a second unit time longer than the first unit time; and
    a clock control means for controlling a clock frequency for performing processing of the receive data by the data processing means in accordance with evaluation results of the acquired long-time variation value,
    wherein the clock control means stops adjustment of the clock frequency when an error of the network or the receive data is detected based on the acquired short-time variation value, and starts adjustment of the clock frequency again after a given adjustment stop time passes from the detection of the error.

2. The receiving device according to claim 1,
    wherein the clock control means detects the error and stops adjustment of the clock frequency in accordance with evaluation results of the long-time variation value when temporal variation of the short-time variation value exceeds a predetermined first threshold.

3. The receiving device according to claim 2, wherein the clock control means adjusts the clock frequency in accordance with evaluation results of the long-time variation value when temporal variation of the short-time variation value is equal to or lower than the first threshold.

4. The receiving device according to claim 3, wherein the clock control means performs evaluation so that the clock frequency is set to a first frequency which is higher than a present frequency when temporal variation of the long-time variation value exceeds a range determined by a predetermined second threshold, the clock frequency is set to a second frequency which is lower than the present frequency when temporal variation of the long-time variation value is lower than the range determined by the second threshold, and the clock frequency is maintained at the present frequency when temporal variation of the long-time variation value is within the range determined by the second threshold.

5. The receiving device according to claim 2, further comprising:

an accumulated quantity acquisition means for acquiring present accumulated quantity of the receive data sequentially accumulated in the buffer, wherein the clock control means, when adjustment of the clock frequency in accordance with evaluation results of the long-time variation value is stopped, makes an adjustment so that the clock frequency is set to a first frequency which is higher than a present frequency when the acquired accumulated quantity exceeds a predetermined upper limit value of the accumulated quantity of the buffer, the clock frequency is set to a second frequency which is lower than the present frequency when the acquired accumulated quantity is lower than a predetermined lower limit value of the accumulated quantity of the buffer, and the clock frequency is maintained at the present frequency when the acquired accumulated quantity is equal to or lower than the upper limit value as well as equal to or higher than the lower limit value.

6. The receiving device according to claim 1, wherein the short-time variation value is an average value of accumulated quantity of the receive data sequentially accumulated in the buffer, which is obtained in the second time scale as the first unit time, and the long-time variation value is an average value of accumulated quantity of the receive data sequentially accumulated in the buffer, which is obtained in the minute time scale as the second unit time.

7. The receiving device according to claim 1, wherein the error is network disturbance or change of a network path as the error of the network, or packet loss as the error of the receive data.

8. A receiving method by a receiving device including a buffer temporarily accumulating receive data received through a network and a data processing means for processing the receive data accumulated in the buffer, comprising:

acquiring a short-time variation value indicating variation of accumulated quantity of the receive data sequentially accumulated in the buffer in a first unit time;

acquiring a long-time variation value indicating variation of accumulated quantity in a second unit time longer than the first unit time;

controlling a clock frequency for performing processing of the receive data by the data processing means in accordance with evaluation results of the acquired long-time variation value;

stopping adjustment of the clock frequency when an error of the network or the receive data is detected based on the acquired short-time variation value; and starting adjustment of the clock frequency again after a given adjustment stop time passes from the detection of the error.

9. A program allowed to be executed by a computer controlling a device including a buffer temporarily accumulating receive data received through a network and a data processing means for processing the receive data accumulated in the buffer, comprising:

acquiring a short-time variation value indicating variation of accumulated quantity of the receive data sequentially accumulated in the buffer in a first unit time;

acquiring a long-time variation value indicating variation of accumulated quantity in a second unit time longer than the first unit time;

controlling a clock frequency for performing processing of the receive data by the data processing means in accordance with evaluation results of the acquired long-time variation value;

stopping adjustment of the clock frequency when an error of the network or the receive data is detected based on the acquired short-time variation value; and starting adjustment of the clock frequency again after a given adjustment stop time passes from the detection of the error.

* * * * *